US011865682B2

(12) United States Patent
Collins

(10) Patent No.: US 11,865,682 B2
(45) Date of Patent: Jan. 9, 2024

(54) PLIER

(71) Applicant: MCNEW TOOL CORP, Gadsden, AL (US)

(72) Inventor: Elvert Fitzugh Collins, Gadsden, AL (US)

(73) Assignee: McNew Tool Corp., Gadsden, AL (US)

( * ) Notice: Subject to any disclaimer, the term of this patent is extended or adjusted under 35 U.S.C. 154(b) by 451 days.

Patent file contains an affidavit/declaration under 37 CFR 1.130(b).

(21) Appl. No.: 16/915,855

(22) Filed: Jun. 29, 2020

(65) Prior Publication Data

US 2020/0406429 A1 Dec. 31, 2020

Related U.S. Application Data

(60) Provisional application No. 62/868,512, filed on Jun. 28, 2019.

(51) Int. Cl.

| | |
|---|---|
| ***B25B 7/02*** | (2006.01) |
| ***B25B 7/08*** | (2006.01) |
| ***B25G 1/10*** | (2006.01) |
| ***B25B 23/16*** | (2006.01) |
| *B25B 7/22* | (2006.01) |

(52) U.S. Cl.

CPC .................. *B25B 7/02* (2013.01); *B25B 7/08* (2013.01); *B25B 23/16* (2013.01); *B25G 1/102* (2013.01); *B25B 7/22* (2013.01)

(58) Field of Classification Search

CPC .... B25B 7/02; B25B 7/04; B25B 7/06; B25B 7/08; B25B 7/22; B25B 23/16; B25G 1/10; B25G 1/102; B25G 1/105; B25F 1/00; B25F 1/04

See application file for complete search history.

(56) References Cited

U.S. PATENT DOCUMENTS 550,981 A * 12/1895 Laube ........................ B25B 7/22 7/130
613,355 A * 11/1898 Burton .................. A47J 43/283 81/417

(Continued)

FOREIGN PATENT DOCUMENTS

GB 2521168 A 6/2015
KR 20120000364 * 1/2012

OTHER PUBLICATIONS

McNew Tool Company HVAC Industrial Duct Tool, www.youtube.com, Feb. 17, 2019.

*Primary Examiner* — Robert J Scruggs

(74) *Attorney, Agent, or Firm* — Jonathan C.“Rudy” Hill; Jonathan Wohlwend; Bradley Arant Boult Cummings LLP

(57) ABSTRACT

An improved plier that advantageously allows a user to clinch duct for installation of duct drives in tight and hard to reach places is disclosed. In a preferred embodiment the improved plier comprises at least two elongate arms comprising handle portions, elbow portions, and jaw portions. The elongate arms are hingedly connected to one another at a hinge point in the elbow portions. The jaw portions further comprise base portions and pincher portions for grasping and clamping of duct work to facilitate installation of duct drives. The pincher portions are offset from the plane of the handle portions at a distance.

12 Claims, 5 Drawing Sheets

(56) References Cited

U.S. PATENT DOCUMENTS

| | | | | |
|---|---|---|---|---|
| 961,989 | A * | 6/1910 | Tanner | B25B 7/02 81/415 |
| 1,910,750 | A * | 5/1933 | Major | B25B 7/02 81/417 |
| 2,535,215 | A | 12/1948 | Klenk | |
| 2,471,372 | A * | 5/1949 | Jankovich | B25B 7/04 81/423 |
| 3,934,286 | A * | 1/1976 | Metzinger | B25C 11/02 7/137 |
| 4,084,457 | A * | 4/1978 | Berg | B25C 11/02 81/424.5 |
| 4,614,001 | A | 9/1986 | Liou | |
| 4,922,770 | A * | 5/1990 | Dlugolecki | B25B 7/12 81/358 |
| 5,323,502 | A * | 6/1994 | Miller | H01R 43/0421 7/107 |
| 5,575,029 | A | 12/1996 | Simpson | |
| 6,934,991 | B2 | 8/2005 | Kinkade | |
| 7,065,819 | B1 | 6/2006 | Minniti | |
| 7,255,027 | B1 | 8/2007 | Tsai | |
| 9,409,290 | B1 | 8/2016 | Gordon | |
| 2004/0255390 | A1* | 12/2004 | Kinkade | B25D 1/045 7/158 |
| 2006/0113091 | A1 | 6/2006 | Millard | |
| 2006/0150786 | A1* | 7/2006 | Whitehead | B25B 7/00 81/300 |
| 2007/0124867 | A1 | 6/2007 | Woods et al. | |
| 2008/0271324 | A1 | 11/2008 | Fryer | |
| 2011/0214537 | A1* | 9/2011 | Redmond | B23B 31/1207 81/91.3 |
| 2012/0010032 | A1* | 1/2012 | Yang | B25B 7/02 473/553 |
| 2019/0364868 | A1 | 12/2019 | Garner | |

* cited by examiner

PLIER

CROSS-REFERENCE TO RELATED APPLICATIONS

This application claims priority to U.S. Provisional Patent Application No. 62/868,512, filed on Jun. 28, 2019, which is incorporated by reference herein in its entirety.

FIELD OF THE INVENTION

The present invention generally relates to a multipurpose tool, more specifically relates to a hand tool for use in installing, removing, or repairing heating, ventilation, and air conditioning (HVAC) systems, and even more specifically relates to a hand tool for gripping, stabilizing, or otherwise manipulating duct while installing, removing, or repairing duct drives for HVAC systems.

BACKGROUND OF THE INVENTION

Trade professionals often use a variety of hand tools when performing certain tasks in the field of HVAC system installation and repair. Specifically, trade professionals typically use a number of different hand tools when installing and repairing duct drives in HVAC systems. Most of the hand tools available are only appropriate for performing limited tasks and functions. Specifically, the current tools used for clamping, holding, and aligning duct during installation of duct drives for HVAC systems are difficult to, or do not, fit into smaller spaces and can only clamp, hold, or align the duct from limited positions. The inability to fit these tools into tight spaces makes it difficult for trade professionals to install duct drives in cramped areas. Yet HVAC systems and specifically their duct are often in tight small spaces, making the current duct drive tools less effective. The currently available tools also carry a higher risk of injury when an operator is attempting to fit the tool into a tight space. The currently available tools are also cumbersome and require the operator to use both hands to manipulate the tool. Moreover, the inability to fit the tool in small or tight spaces results in improperly installed duct, leaks, and gaps, and, thus, ineffective or inefficient HVAC systems. Furthermore, the current tools designed for clinching, clamping, holding, and aligning duct for installation of duct drives are only useful for clinching, clamping, holding, and aligning new duct work and/or repairing duct. To complete other tasks that require clinching, clamping, holding, and aligning parts and systems associated with working with HVAC systems, such as connecting “S” locks; connecting flat “S” locks; connecting flat drive cleats; prying loose flat drive cleats; crimping pex pinch clamps; cutting wires; and removing duct, other tools must be used, which is time consuming, labor intensive, and more costly.

SUMMARY OF THE INVENTION

In view of the foregoing disadvantages present in the prior art, the present invention provides an improved plier for use in installation and repair of HVAC systems, including installing and otherwise manipulating duct drives, that is more effective and efficient. Advantageously, a preferred embodiment of the present invention can fit into tight and small spaces, can be turned and positioned for ease of use, and can be manipulated by an operator using only one hand. Thus, the present disclosure describes a more effective tool for installing duct drives in small or tight spaces, thereby reducing the number and types of tools necessary for installing duct drives and reducing the time required to install duct drives. The improved plier of the present invention is made of a durable material thus providing maximum leveragability and improved tensile strength.

In a preferred embodiment, the said improved plier comprises elongate arms designed to allow for maximum range of motion and to reach into tight and small spaces. The said improved plier of the present invention further comprises jaw portions comprising base portions and pincher portions for grasping and clamping of duct work necessary to install or repair duct drives. For example, the pincher portions can be used to clinch the duct in place while the duct drives are installed. The said improved plier further comprises a hinge point in close proximity to the said jaw portions. These features allow the said improved plier to be attached to the duct at a plurality of different angles and positions and enable positioning in smaller spaces. Advantageously, when used to install duct drives, the positioning of the pincher portions allows for an operator to reach portions of the duct beyond those directly in front of the operator and to use the said improved plier to clinch and hold the duct in place during installation or repair of duct drives. Such positioning also allows for the said improved plier to be used at varying angles with full extension of the operator’s arms, thus providing greater range of motion in small or tight spaces.

The improved plier is useful for a number of tasks including but not limited to: holding and aligning duct in place; connecting “S” locks; connecting flat “S” locks; connecting flat drive cleats; prying loose flat drive cleats; crimping pinch clamps; cutting wires; and removing duct. Other useful functions for the improved plier of the present invention may be appreciated by one of ordinary skill in the art of this disclosure.

The above presents a simplified summary to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

BRIEF DESCRIPTIONS OF THE DRAWINGS

The accompanying drawings incorporated in and forming a part of this specification illustrate several aspects of the disclosure, and together with the written description serve to explain the principles of the disclosure.

It should be noted that identical features in different drawings are shown with the same reference numeral. Various other objects, features, and attendant advantages of the present invention will become fully appreciated as the same becomes better understood when considered in conjunction with the accompanying drawings. Applicant has enclosed herewith drawings, FIGS. 1-5, which will facilitate an understanding of the subject matter sought to be patented.

DETAILED DESCRIPTION OF THE INVENTION

Figure 1:
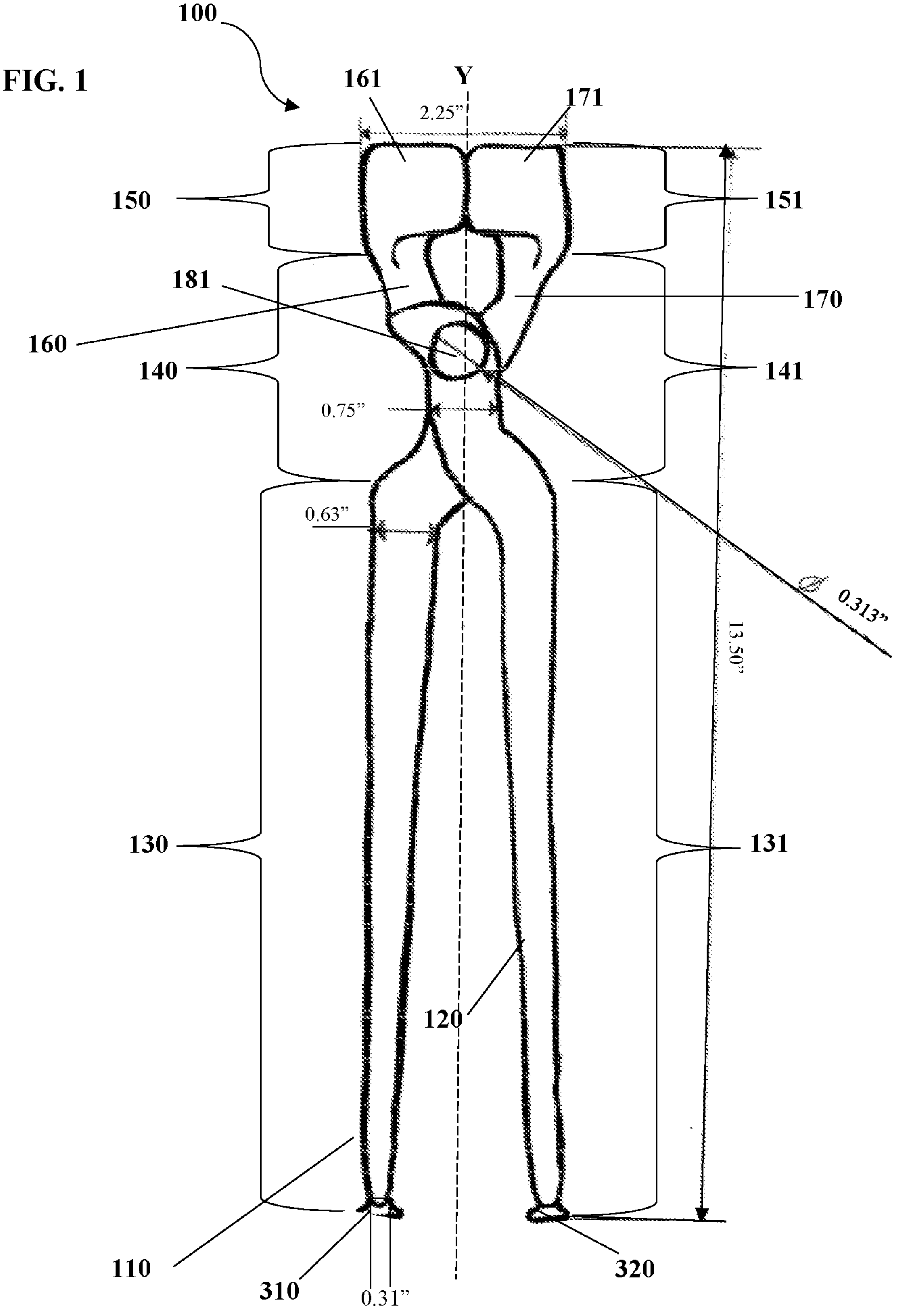
FIG. 1 shows a front view of an embodiment of an improved plier of the present invention in a closed position.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

The present disclosure relates to an improved plier 100 having elongate arms 110, 120 for multi-purpose functions and specifically for a variety of tasks involved in HVAC installation and repair. A general embodiment of an improved plier 100 of the present invention comprises at least a first elongate arm 110 hingedly connected to a second elongate arm 120 at a pivot point 181. The said first elongate arm 110 comprises a first handle portion 130, a first elbow portion 140, and a first jaw portion 150. The second elongate arm 120 comprises a second handle portion 131, a second elbow portion 141, and a second jaw portion 151. The said first and second elongate arms 110, 120 forming an improved plier 100 having a proximal end 190 and a distal end 191.

Figure 2:
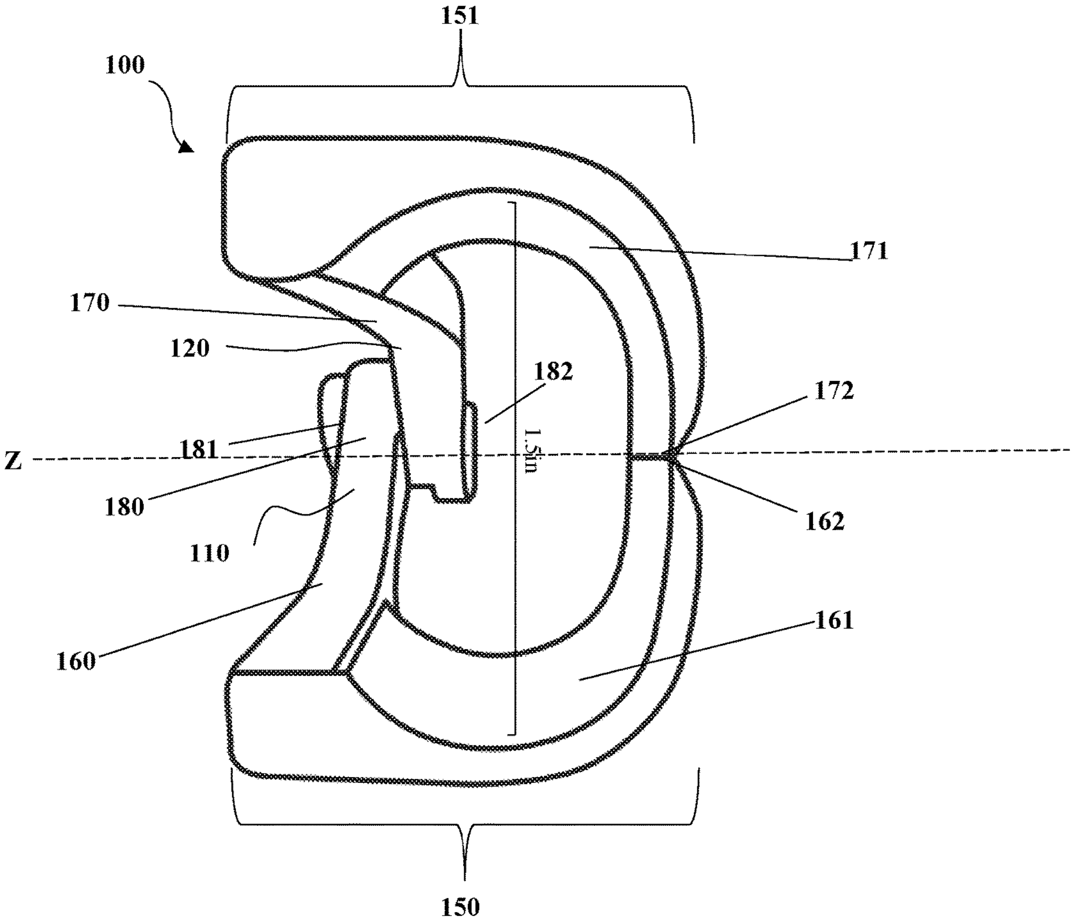
FIG. 2 shows a top view of the improved plier of FIG. 1 in a closed position.
Figure 3:
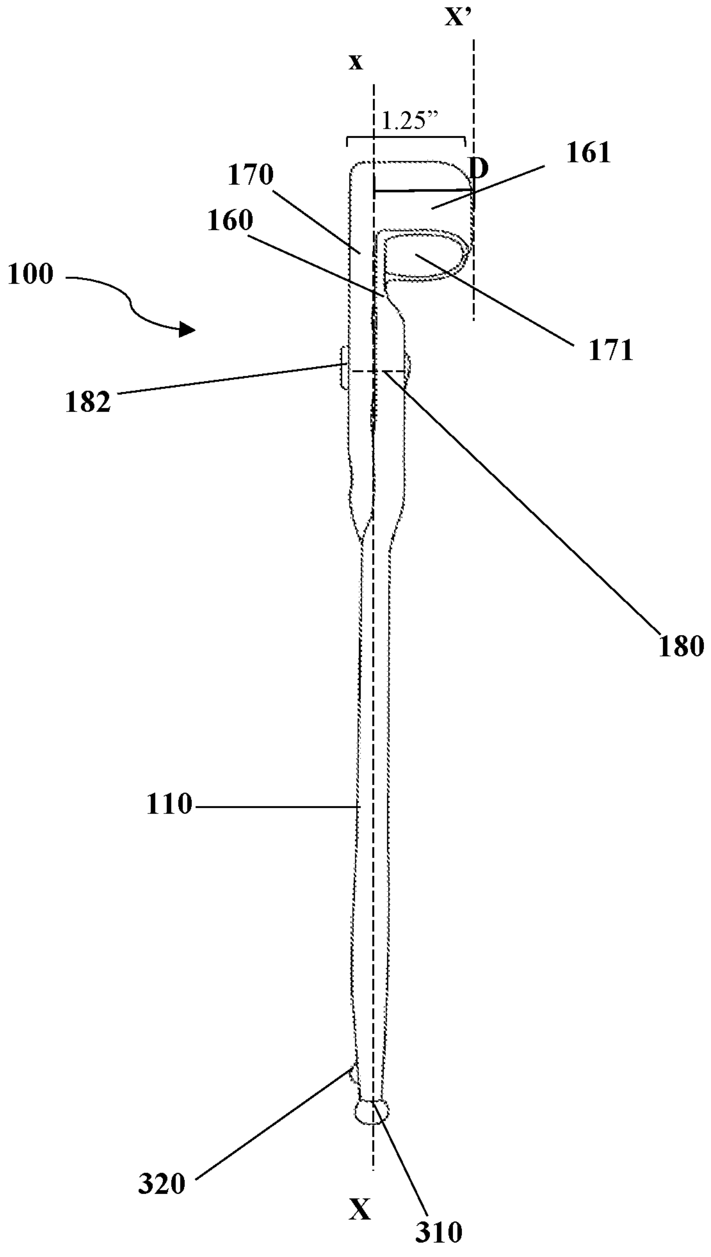
FIG. 3 shows a side view of the improved plier of FIG. 1 in a closed position.
Figure 4:
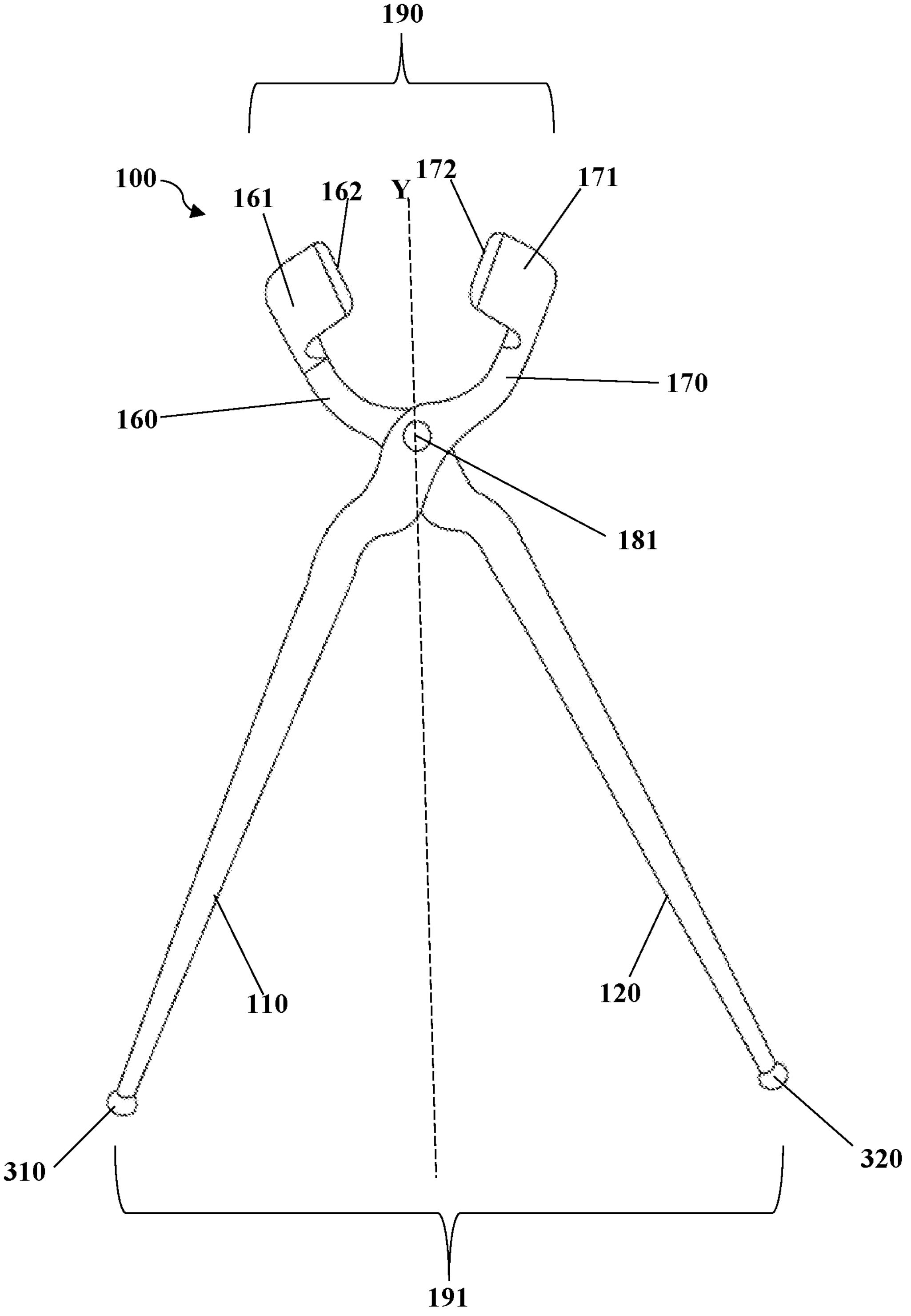
FIG. 4 shows a front view of the improved plier of FIG. 1 in an open position.
Figure 5:
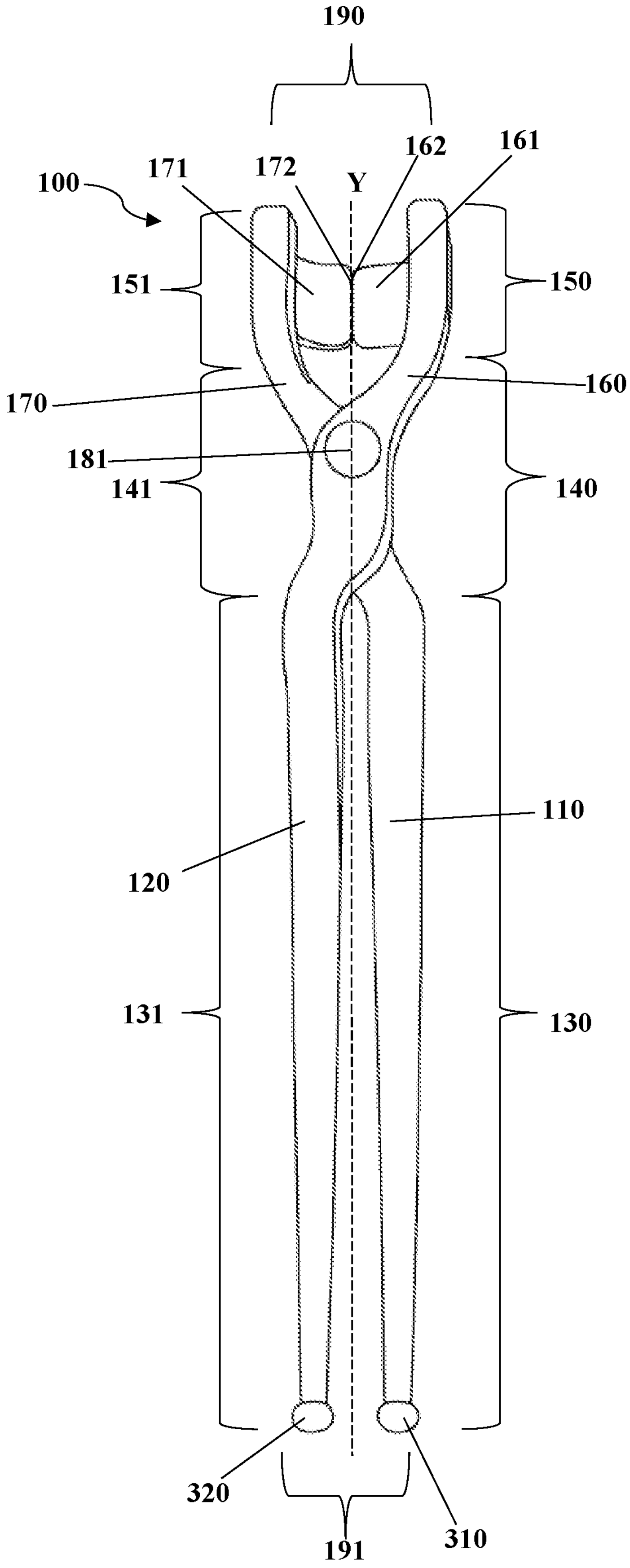
FIG. 5 shows a rear view of the improved plier of FIG. 1 in a closed position.

The handle portions 130, 131 of the elongate arms 110, 120 generally lie along an axis X as shown in FIG. 3. The first and second jaw portions 150, 151 further comprise a first base portion 160 and a second base portion 170, respectively, which extend away from one another at an angle as they move toward the proximal end 190 of the improved plier 100. The first and second jaw portions 150, 151 further comprise a first pincher portion 161 and a second pincher portion 171 connected to and extending from the first and second base portions 160, 170 respectively. As shown in FIGS. 2 and 3, the second base portion 170 bends back towards and ultimately aligns with axis X as it extends toward the proximal end 190 of the improved plier 100 so that the said first and second pincher portions 161, 171 extend from the same plane. The pincher portions 161, 171 first extend perpendicularly from the base portions 160, 170 and then curve inwardly towards one another and taper to terminate at opposed clinching edges 162, 172. The opposed clinching edges 162, 172 contact one another when the improved plier 100 is in a closed position and no foreign material is placed between them, or, when a foreign material is placed in between them, they contact the foreign material in close proximity to one another for the purpose of gripping it or maneuvering it or otherwise manipulating it. In a preferred embodiment, the opposed clinching edges 162, 172 are substantially linear and, when engaged, align with one another along an axis X' that is generally parallel to axis X and offset from axis X at a distance D. In a preferred embodiment, D is approximately 1.00 inches (2.54 centimeters). In an alternative embodiment, the opposed clinching edges 162, 172 may be jagged and patterned in such a way as to align with one another when the improved plier 100 is in its closed position. In yet another alternative embodiment, the opposed clinching edges 162, 172 may have patterned or irregular hatching or the like to improve gripping performance.

Generally, the said first and second handle portions 130, 131 are greater in length than the first and second elbow portions 140, 141 and the first and second jaw portions 150, 151 combined. Advantageously, the said handle portions being greater in length produces increased leverage and tensile strength. Moreover, the length of the said handle portions 130, 131 being greater relative to the length of the elbow portions 140, 141 and jaw portions 150, 151 allows the said improved plier 100 to be used in tighter and harder to reach spaces.

To operate the said improved plier 100 of the present invention, the said first and second elongate arms 110, 120 are moveable to a plurality of open positions and a closed position. The first and second elongate arms 110, 120 are moved to one of a plurality of open positions by manually pulling the handle portions 130, 131 of the respective said first and second elongate arms 110, 120 apart from one another. The said improved plier 100 is in its widest open position when the handle portions 130, 131 directly contact the respective elbow portions 140, 141. The said improved plier 100 is moved into the closed position from an open position by moving the handle portions 130, 131 of the said first and second elongate arms 110, 120 towards one another. In the closed position, the said handle portions 130, 131 are grasped by hand to stabilize and maintain the opposed clinching edges 162, 172 in contact with a foreign material to be gripped, maneuvered, or otherwise manipulated. An advantage of the improved plier 100 of the present invention is that an operator can maintain the positioning of the opposed clinching edges 162, 172 when the improved plier 100 is in the closed position with only one hand. Advantageously, the operator is able to maintain the position of the said improved plier 100 in tight or hard to reach spaces while still having a free hand to perform other tasks.

The said improved plier 100 may be formed of any durable material. In a preferred embodiment, the said improved plier 100 is formed of metal; more preferably the said improved plier 100 is formed of stainless steel. Further, the said improved plier 100 is preferably comfortable for the user to grip and may include a non-slip material or texture on all or parts of the handle portions 130, 131, such as rubber. Additionally, other features or materials known to those of ordinary skill in the art of this disclosure may be incorporated to the handle portions 130, 131 to increase grip and reduce slippage. Further, in a preferred embodiment of an improved plier of the present invention, the handle portions 130, 131 may further comprise rounded knobs 310, 320 at the distal end 191 of the improved plier 100 to prevent an operator's hands from slipping off of the said handle portions.

In a preferred embodiment, the said first and second elongate arms 110, 120 are pivotally engaged with one another about a pivot axis Z at a pivot point 181 and are connected by a connection pin 182. The pivot axis Z, pivot point 181, and connection pin 182 are positioned on the first and second elbow portions 140, 141 of the first and second elongate arms 110, 120.

In a preferred embodiment of the present invention, the elbow portions 140, 141 of the elongate arms 110, 120, extend from the handle portions 130, 131 to the jaw portions 150, 151. As they begin to extend from the handle portions 130, 131, they bend in towards one another with respect to an axis Y running along the length of the improved plier 100 and bisecting the pivot point 181. At the same time, they bend outwardly away from one other with respect to the axis X. The purpose of these extensions is to enable the elongate arms 110, 120 to overlap at the pivot point 181 to form a hinged connection.

In a preferred embodiment, the said first and second elongate arms 110, 120 are pivotally connected to one another by a connection pin 182 at pivot point 181, the said first and second elongate arms 110, 120 being moveable about the pivot point 181 between a closed position and a plurality of open positions. When in the closed position, the two pincher portions 161, 171 of the said jaw portions 150, 151 touch along opposed clinching edges 162, 172 whereby the two pincher portions 161, 171 form a generally semi-ovate shape about the axis Z. In an exemplary embodiment, as shown in FIG. 1, when in the closed position, the combined width of the said first and second jaw portions 150, 151 is approximately 2.25 inches (5.715 centimeters), each opposing pincher accounting for approximately half of that width.

In an exemplary embodiment, as shown in FIG. 1, the length of the said improved plier 100 from the distal end 191 to the proximal end 190 along the axis Y is approximately 13.5 inches (34.29 centimeters); the length from the distal end 191 to the pivot point 181 along the axis Y is approximately 11 inches (27.94 centimeters); and the length from the pivot point 181 to the proximal end 190 of the improved plier 100 along the axis Y is approximately 2.5 inches (6.35 centimeters).

In a preferred embodiment, the said handle portions 130, 131 of the said first and second elongate arms 110, 120 are tapered such that the handle portions 130, 131 adjacent to the said elbow portions 140, 141 are greater in width than the opposite ends of the said handle portions 130, 131 adjacent to the rounded knobs 310, 320. As shown in FIG. 1, the widths of the said handle portions 130, 131 are tapered from approximately 0.63 inches (16 millimeters) at the portions adjacent to the elbow portions 140, 141 to approximately 0.31 inches (7.874 millimeters) at the portions adjacent to rounded knobs 310, 320. The connector pin 182 at the said pivot point 181 has a diameter of approximately 0.313 inches (7.95 millimeters).

Advantageously, when used to install or repair duct drives, the positioning of the opposed clinching edges 162, 172 allows an operator to reach portions of the duct beyond those directly in front of the operator and to use the said improved plier to clinch and hold the duct in place. Such positioning allows for the said improved plier 100 to be used at varying angles with full extension of an arm of an operator, thus providing greater range of motion in small or tight spaces.

In an exemplary embodiment, when said improved plier 100 is in the closed position, the said pincher portions 161, 171 of the jaw portions 150, 151 form a generally semi-ovate shape with a radius of approximately 0.5 inches (1.27 centimeters). In an exemplary embodiment, as shown in FIG. 2, when the said improved plier 100 is in the closed position, the maximum distance between the inside surfaces of the two said pincher portions 161, 171 is approximately 1.5 inches (3.81 centimeters). When said improved plier 100 is in the closed position, the distance between the outside edges of the two handle portions 130, 131 at the distal end 191 is approximately 0.9 inches (2.286 centimeters). Other sizes and dimensions may be utilized for the improved plier 100 of the present invention.

By virtue of the design and interaction of the various component features of the disclosed improved plier 100 the said opposed clinching edges 162, 172 of the jaw portions 150, 151 are capable of clamping, pinching, or cutting sections of duct during duct drive installation and repair of HVAC systems in tighter and smaller spaces and at a variety of angles. As described above, the said improved plier may be used in applications other than HVAC and duct driver installation. The said improved plier may be used in any situation where clamping, pinching, or cutting is necessary, more advantageously in tight or hard to reach spaces.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and knowledge of one of ordinary skill in the art of this disclosure. The embodiments described hereinabove are further intended to explain certain best modes known of practicing the processes, machines, manufactures, compositions of matter, and other teachings of the present disclosure and to enable others skilled in the art to utilize the teaching of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

What is claimed is:

1. An improved plier for gripping an object having a closed position and a plurality of open positions, said improved plier comprising:

a first elongate arm comprising a first handle portion, a first elbow portion extending from the first handle portion, and a first jaw portion extending from a terminal end of the first elbow portion, the first jaw portion further comprising a first pincher with a first leading edge;

a second elongate arm hingedly connected to the first elongate arm and comprising a second handle portion, a second elbow portion extending from the second handle portion, and a second jaw portion extending from a terminal end of the second elbow portion, the second jaw portion further comprising a second pincher with a second leading edge, wherein the handle portions and elbow portions of the elongate arms lie substantially within a first plane and wherein the first jaw portion and the second jaw portion extend outwardly from the first plane and curve inwardly towards one another such that their respective leading edges meet along a second plane when the improved plier is in the closed position;

wherein the first and second pinchers further comprise ovate portions and wedge portions;

wherein the ovate portions are curvilinear and taper from the terminal ends of the elbow portions to the wedge portions;

wherein the wedge portions taper from the ovate portions to the respective leading edges; and wherein the first plane is substantially parallel to the second plane and offset from the second plane at a distance when the improved plier is in the closed position.

2. The improved plier of claim 1 wherein the first elbow portion of the first elongate arm is hingedly connected to the second elbow portion of the second elongate arm at a pivot point.

3. The improved plier of claim 2 wherein the first and second elbow portions overlap and align at an axis running through the pivot point.

4. The improved plier of claim 1 wherein the leading edges are linear.

5. The improved plier of claim 4 wherein the leading edges are rough.

6. The improved plier of claim 1 wherein said improved plier is formed of a metal.

7. The improved plier of claim 6 wherein the metal is a steel alloy.

8. The improved plier of claim 1 wherein said first and second handle portions are tapered.

9. The improved plier of claim 1 wherein the first handle portion further comprises a first rounded knob.

10. The improved plier of claim 9 wherein the second handle portion further comprises a second rounded knob.

11. The improved plier of claim 10 wherein the rounded knobs are located at the ends of the handle portions opposite the elbow portions.

12. The improved plier of claim 1 wherein the length of a portion of the plier comprising the first and second handle portions is greater than the length of a portion of the plier comprising the first and second elbow portions and the first and second jaw portions.

* * * * *